March 24, 1942.  E. E. LINDSEY  2,277,120
MIXING, DISPERSING, AND EMULSIFYING MACHINE
Filed Jan. 2, 1940  2 Sheets-Sheet 1
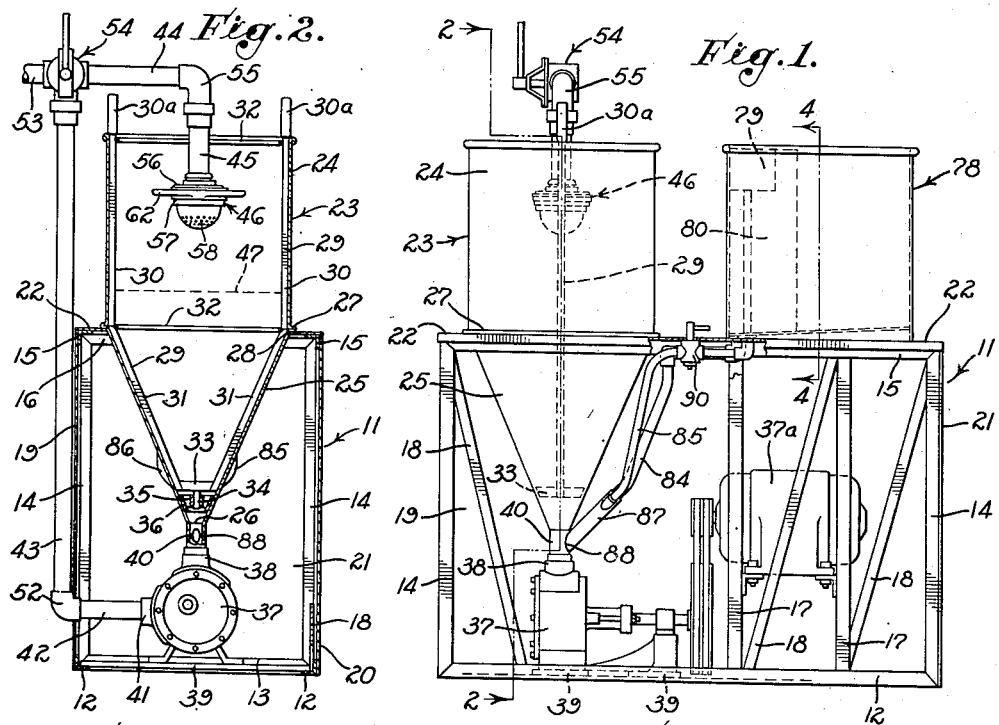
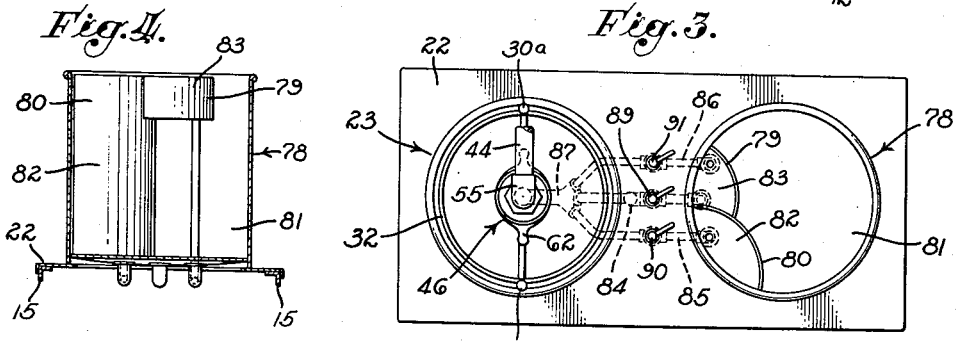
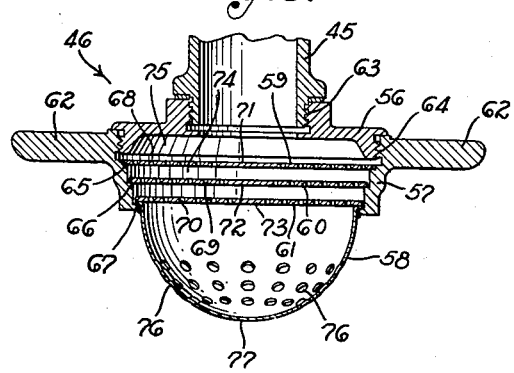
INVENTOR
ERNEST E. LINDSEY
BY
HARRIS, KIECH, FOSTER & HARRIS
ATTORNEYS.

March 24, 1942.  E. E. LINDSEY  2,277,120

MIXING, DISPERSING, AND EMULSIFYING MACHINE

Filed Jan. 2, 1940  2 Sheets-Sheet 2

INVENTOR
ERNEST E. LINDSEY
BY HARRIS, KIECH, FOSTER & HARRIS
ATTORNEYS.

Patented Mar. 24, 1942

2,277,120

UNITED STATES PATENT OFFICE 2,277,120

MIXING, DISPERSING, AND EMULSIFYING MACHINE

Ernest E. Lindsey, Los Angeles, Calif., assignor, by mesne assignments, to A. T. Case Company, Los Angeles, Calif., a corporation of California Application January 2, 1940, Serial No. 313,194

8 Claims. (Cl. 259—95)

This invention relates to mixing machines, and while as to some of its features it relates to such machines irrespective of any emulsifying action which they may perform, it is as to other features particularly adapted to emulsifying machines. The invention is shown and described as embodied in a machine especially adapted for making mayonnaise and salad dressings, and while certain of its features are limited to a machine of this character, it is to be understood that in its broadest aspects the invention is not limited to a machine for making mayonnaise and salad dressings.

One object of the invention is to provide a machine for rapidly producing a homogeneous mixture of several materials.

Another object of the invention is to produce a machine which will in a relatively short period of time manufacture an emulsion having the qualities of stability and uniformity of size of particles of the dispersed phase and which is adapted to a nice regulation of the size of said particles.

Another object of the invention is to provide a machine for making an emulsion comprising an emulgator which will use a minimum quantity of the emulgator.

Another object of the invention is to provide a machine of this character which will be sanitary and easy to clean and sterilize.

Another object is to provide a machine of this character which will be of simple construction and will comprise relatively few moving parts, and that will be inexpensive in the use of power, readily repaired, and subject to relatively little wear.

Another object of the invention is to provide in a machine of this character a self-contained unit in which all of the parts are conveniently and accessibly mounted on a single frame, requiring a minimum of floor space and capable of convenient and easy operation by one man.

Another object of the invention is to provide in a machine of the character described an emulsifying device of high efficiency without moving parts.

Another object is to provide a machine which will be capable of proper coordination between the degree of dispersion, the fineness of the dispersed particles, and the rate of formation of that cellular structure of an emulgator which gives greater solidity and permanence of form such as egg substance.

Another object of the invention is to provide an emulsifying machine for the preparation of food products such as mayonnaise dressing, which will be capable of producing an article having a smooth texture and an agreeable flavor.

Further objects and advantages of the invention will be made evident throughout the following part of the specification.

Referring to the drawings, which are for illustrative purposes only,

Fig. 1 is a side elevation of a mayonnaise making machine embodying this invention.

Fig. 2 is a vertical sectional view of the machine taken along the line 2—2 of Fig. 1.

Fig. 3 is a top plan view of the machine.

Fig. 4 is a vertical sectional view of the multiple reservoir taken along the line 4—4 of Fig. 1.

Fig. 5 is a vertical sectional view of the discharge head of the machine.

Figure 6:
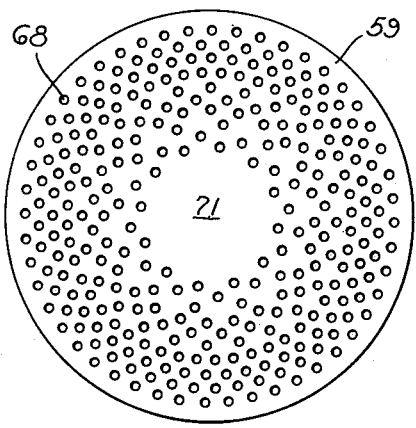
Figure 7:
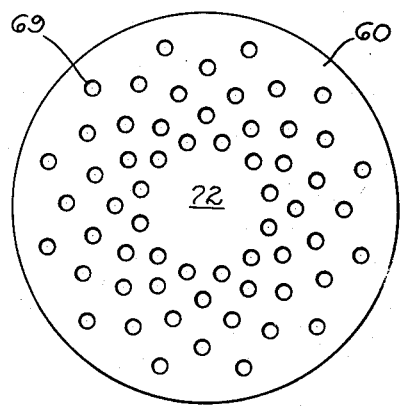
Figure 8:
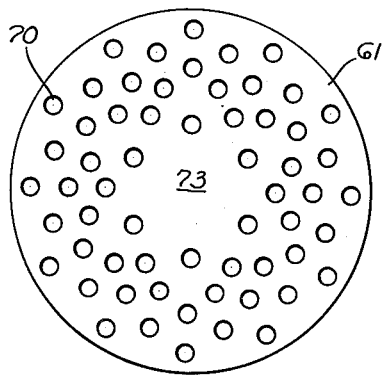

Figs. 6, 7, and 8 are plan views respectively of the three apertured plates of the discharge head.

Figure 9:
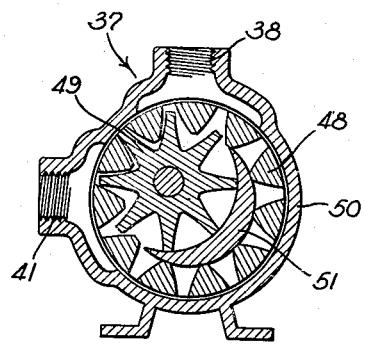

Fig. 9 is a vertical sectional view showing the internal construction of the pump of the machine.

The frame, generally designated by the numeral 11, is shown in its preferred form of a right rectangular parallelapiped constructed of lengths of angle irons suitably secured in their proper assembled relationship by welding or any other desired means. The base of this frame comprises rectangularly arranged front and rear angle iron lengths 12 and end angle iron lengths 13. At each corner of the base is placed an upright angle iron length 14, which lengths carry at their upper ends the top frame comprising front and rear angle iron lengths 15 and end angle iron lengths 16. Additional uprights 17 and diagonal braces 18 serve to give strength and rigidity to the frame.

Removable panels 19, 20, and 21 are preferably provided and bolted to the front and rear sides of the frame and to one end thereof shown at the right of Fig. 1, respectively. Upon the top angle iron lengths 15 and 16 of the frame is secured a rectangular plate 22, the support of which may be strengthened by horizontal cross bars (not shown) connecting the upper ends of the uprights 17.

A mixing tank 23 has an upper cylindrical portion 24 open at both ends and a lower conical portion 25 arranged with its larger end registering with and secured to the lower end of the cylindrical portion 24 and with its smaller end disposed at the bottom of the tank 23 and provided with a small aperture 26.

An annular flange 27 formed at the lower end of the cylindrical portion 24 of the tank 23 rests upon the rim of a circular opening 28 in the plate 22, thereby supporting the tank 23 in position upon the framework of the machine. Two scraper blades 29, each having a vertical section 30 and an inclined section 31 to conform to the shape of the interior of the mixing tank 23, are held in diametrically opposite positions relative to each other by framing rings 32. The lower ends of the sections 31 are secured to a spider 33 having a bearing pin 34 which is journaled in a bearing 35 carried by a stationary spider 36 secured within the conical portion 25 of the mixing tank 23 near the aperture 26.

A rotary pump 37 is mounted, with its inlet fitting 38 directly below the aperture 26, on horizontal cross bars 39 carried by the angle irons 12. The aperture 26 is connected with the inlet fitting 38 by a short pipe section 40. The pump is driven by a motor 37a suitably mounted on the frame 11.

Material in the mixing tank settles by gravity, moving downwardly in the conical portion 25 of the tank, through the openings in the spiders 33 and 36, and through the aperture 26 and pipe section 40 to the pump 37, by which it is propelled through an outlet fitting 41, a horizontal pipe section 42, vertical pipe section 43 mounted adjacent the panel 19, horizontal pipe section 44, vertical pipe section 45 which projects coaxially into the upper portion of the tank 23, and the terminal discharge head 46, from which the material issues under the pressure generated by the pump and falls to the surface 47 of the material in the upper cylindrical portion 24 of the tank. From time to time as the material is being thus circulated, the scraper blades 29 may be whirled within the tank by means of handles 30a to remove material adhering to the sides of the tank and to keep in circulation material adjacent these sides.

The tank, pipe section 40, pump 37, pipe sections 42 to 45, and discharge head 46 constitute a circulating system, and we will now consider and describe some of the details of this system. The pump 37 serves both to apply pressure to the circulating liquid or semi-liquid materials for the mixing of which the machine may be used, and also by reason of the character of its action to mix the materials into a homogeneous mass and to subdivide the particles of the material. It is apparent that any kind of centrifugal or rotary pump having a rotor and a stator will increase the homogenity of a mix. To accomplish the subdivision of the particles of the material which constitutes the dispersed phase of an emulsion, or to properly subdivide the particles of material which constitutes the emulgator of an emulsion, if the subdividing agency be a centrifugal or rotary pump, it is desirable that the clearance between the rotor parts and the stator parts of the pump be but a few thousandths of an inch, and under some conditions as small as one thousandth of an inch. The forward advancing edges of the rotor parts, as they revolve rapidly past the stator, subject to a shearing and subdividing action those particles of the material which are not impelled forward to the pump discharge outlet, but which, due to the slip of the pump, pass into the clearance space between the rotor and stator.

While any pump having a rotor and stator will to a varying degree subdivide particles of a material passing through it, I prefer to use a pump of the type disclosed in Fig. 9 of the drawings because of the high degree and rapidity of the shearing action of a pump of this design. The pump has two rotors, one the internally toothed ring gear 48 and the other the spur gear 49 mounted eccentrically with respect to the gear 48 and meshing therewith. The pump stator also has two parts, one the cylindrical shell 50 concentric with the gear 48 and the other the crescent 51 occupying the space between the teeth of the two gear wheels. The several clearance spaces between the two rotors and the two stators are not more than one or two thousandths of an inch. The large number of moving surfaces on the rotors which are arranged at a substantial angle to the several stationary surfaces on the stators move rapidly past these stationary surfaces when the pump is in operation. The small clearance and large number of passages of rotor surfaces past stator surfaces for each revolution of the pump are factors causing a rapid and effective subdivision of the particles of the material being treated, and also a very thorough and uniform dispersion of the particles of one component material throughout particles of the other component materials.

The pipe section 42 is connected with the pipe section 43 by an elbow 52. At the upper end of the pipe section 43 and connecting it both with the pipe section 44 and with a discharge pipe 53 is a three-way valve fitting 54 by means of which material flowing upward in the pipe section 43 may be either directed into the pipe section 44 for discharge into the tank 23, or directed into the discharge pipe 53 upon the completion of the mixing and preparation of a batch of the dressing. The pipe section 44 is connected to the pipe section 45 by an elbow 55.

The discharge head 46 and the lower end of the pipe section 45 upon which the discharge head is mounted are disposed centrally within the upper portion of the tank 23. The discharge head comprises a cover plate 56, a housing 57, a rigid spheroidal bottom wall or bowl 58 having a smooth inner surface, and at least one and preferably two or more rigid smooth-surfaced, apertured plates 59, 60, and 61. The cover plate 56 is secured to the lower end of the pipe 45 in any suitable manner, being shown in the drawings as being provided with a threaded connection 63 for that purpose. The housing 57 is removably secured to the cover plate 56, preferably by a threaded connection such as shown at 64. Handles 62 afford a convenient means for manually turning the housing 57 for engagement or disengagement with the cover plate 56. The housing 57 is formed with a series of stepped shoulders 65, 66, and 67 on its inner cylindrical wall providing annular horizontal supporting surfaces upon which loosely rest the plates 59, 60, and 61 respectively. While as to some features of this invention one or two or all three of these plates may be omitted, I prefer, especially for certain uses of the invention, to provide three plates as shown in the drawings. The lower end of the housing 57 carries the spheroidal bottom wall or bowl 58 formed of relatively thin metal. It may be secured to the housing 57 in any suitable manner, being shown in the drawings as provided with an outwardly extending annular flange at its upper end seated between the lower shoulder 67 and the lower plate 61 and welded to the housing 57. The plates 59, 60, and 61, since they rest loosely upon the supporting shoulders 65, 66, and 67, may be readily removed from the discharge head by unscrewing the housing from the cover plate 56 and inverting the housing, from which the plates will then fall by gravity.

The plates 59, 60, and 61 are apertured to provide orifices 68, 69, and 70, as shown in Figs. 6, 7, and 8. The central portions 71, 72, and 73 of the three plates respectively are preferably solid and devoid of orifices. The diameter of the central portion 71 is substantially the same as that of the pipe section 45.

The size and distribution of the orifices of the several plates may be varied for use with different materials and for manufacturing different products. The plates shown in Figs. 6, 7, and 8 respectively are shown with apertures of a representative size and representative distribution and illustrate certain features of the invention. In order that these features may be better understood, a table descriptive of the three plates shown in Figs. 6, 7, and 8, and of orifices, and setting forth their dimensional characteristics is herewith given, the figures being taken from a sample and representative set of plates actually used in a production machine embodying this invention.

|  |  | Plate number | | |
| --- | --- | --- | --- | --- |
|  |  | 59 | 60 | 61 |
| Plate diameter | inches | 3.75 | 4.00 | 4.25 |
| Orifice diameter | do | .1875 | .170 | .0938 |
| Number of orifices |  | 30 | 60 | 300 |
| Total area of plate | inches | 11.05$^2$ | 12.58$^2$ | 14.20$^2$ |
| Single orifice area | do | .0276$^2$ | .0227$^2$ | .0069$^2$ |
| Total orifice area | do | 1.658$^2$ | 1.36$^2$ | 2.07$^2$ |
| Net solid area | do | 9.39$^2$ | 11.22$^2$ | 12.13$^2$ |
| Diameter solid centers 71, 72, 73 | do | 1.25 | 1.25 | 1.31 |
| Area of solid centers | do | 1.23$^2$ | 1.23$^2$ | 1.35$^2$ |
| Net solid ring area | do | 8.16$^2$ | 9.99$^2$ | 10.78$^2$ |
| Single orifice perimeter | do | .589 | .534 | .295 |
| Total orifice perimeter | do | 35.3 | 32.0 | 88.4 |

The central solid plate portion 71 receives the stream of oncoming material from the pipe section 45 and spreads it out in fan-like fashion in every direction radially over the upper surface of the plate 59 and transversely across the upper ends of the orifices 68. As the material crosses any one of these orifices, some of it enters the orifice and passes into a chamber 74 between the plates 59 and 60, most of the material, however, moving on and radially outwardly over the plate. As the horizontal, outwardly moving streams of material are thus divided by their impact against the outer arcs of the upper edges of the orifices 68, particles of the component material are split and subdivided by the shearing action of the sharp edges of the orifices. It will be observed that the radially outward movement of the material over the upper face of the plate 59 results in part from the fact that the plate 59 and the disk-like chamber 75 above it are of substantially greater diameter than that of the pipe section 45 immediately above the plate 59.

By an inspection of Figs. 6 and 7 and an examination of the above data table, it will be seen that the total apertured area of the plate 60 is substantially less than the total apertured area of the plate 59. This difference is sufficiently great that even though it may be counteracted in part by other characteristics of the aperture pattern of the two plates, the flow resistance offered by the plate 60 is greater than that offered by the plate 59. This difference in flow resistance between the two plates causes the plate 60 to deflect upwardly a part of the material received upon its upper surface in eddy or vortex currents which move across the under face of the plate 59, where the particles are subjected to a further subdividing action against the sharp perimetral edges of the lower ends of the apertures 68. The third plate may be designed to offer less flow resistance than the second plate, which will give to the jets of material passing through the orifices 69 of the second plate a greater velocity than otherwise. These jets strike the upper face of the third plate 61 with great force and are spread out across the top surface of the plate 61, where they are again subjected to the shearing and subdividing action of the perforations 70. Fig. 7 shows the plate 61 designed in this fashion, and the statistics relating to plates 60 and 61 in the above data table show that the flow resistance of the plate 61 is substantially less than that of plate 60.

Figs. 6, 7, and 8 and the data table illustrate one effective design for the plates of the discharge head. It will be understood of course, however, that the arrangement and size of the apertures in the several plates respectively may be varied to suit conditions and to accomplish results of another kind when such results may be desired. Transverse currents, eddy currents, and other forms of turbulence within the head promote a subdivision of the particles of the material and dispersion of the material in a uniform, thorough manner to produce a mix having a high degree of homogeneity.

The spheroidal bottom wall or bowl 58 has a plurality of orifices 76 distributed in an annular zone surrounding a central portion 77 of the bowl which is devoid of apertures. These orifices are designed as to diameter, as to their location relative to each other, as to their distribution over the bowl, and as to their angle of discharge, so that a given material at a given pressure within the bowl will issue from the apertures or orifices 76 in jets having trajectories and rates of flow adapted to cause a deposit of the material at a quantitatively even rate over the top surface 47 of the material in the tank. Under some conditions this result is furthered by designing the bowl to throw some of the outermost jets against the side walls of the tank at levels above the surface 47.

It is very desirable in a mixing, dispersing, or emulsifying machine in which the material during a multiple-cycle circulatory operation, such as is characteristic of the machine herein described, is subjected to a series of physical and chemical actions, that all parts of the stream, that is, both the central and peripheral portions of the stream, travel at a uniform rate of speed; or, where this uniformity of speed is not entirely attainable, that the central and peripheral portions of the stream be thoroughly mixed and homogenized at several points of the circulatory system. It will be observed that in the machine of this invention the various ingredients of the final product are subjected to a subdividing and mixing action in the pump 37. During the travel of the material through the pipe sections 42, 43, 44, and 45, the material moves more rapidly in the center of the column of material within the pipe than it does in the outer portion of the stream adjacent and in contact with the pipe walls. Chemical actions, such, for instance, as the coagulation of the albuminous portions of the egg material of a mayonnaise dressing which is to be manufactured in the machine, proceed to a more complete stage in the outer portions of the column of material within the pipe sections 42 to 45 than they do in the more central portions of the stream. As a result, the material, when it arrives at the discharge head 46, is not of a chemically uniform character. The same holds true with regard to physical changes, such as that of emulgation of the particles of a dispersed phase within an emulgator. The discharge head 46, however, thoroughly homogenizes the stream of material passing through it so that large and small particles of the various components of the mix, particles which have reached more and less advanced stages of coagulation, and particles which are more and less completely emulgated, are thoroughly and homogeneously distributed and dispersed throughout the mass of the material irrespective of the degree to which these various physical, mechanical, and chemical operations have been carried.

The material thus homogenized is evenly distributed over the top surface 47 of the material within the tank. The material then gradually moves downward to the pipe section 40, the sloping surfaces of the conical portion 25 of the tank being designed to allow all portions of the body of material in the tank to move at a substantially uniform rate of speed to the pipe section 40, from which it passes through the outlet 38 into the pump 37. Operation of the scraper blades 29 prevents retardation of that portion of the material in contact with the sides of the tank.

It is well recognized that a pump having a rotor and a stator, that is, a pump of either the centrifugal or rotary type, has a greatly increased subdividing and dispersing effect upon the particles of material passing through it if its propelling action is resisted by a high pressure head. This is true because a high pressure head brings about a correspondingly greater degree of slip within the pump. As has been above pointed out, the characteristic feature of what is termed "slip" in a pump is the backward flow of the material acted upon between the rotating and stationary parts of the pump. When the clearance between these parts is very small, the material which thus flows backward is very effectively subdivided and dispersed.

In this invention this desirable back pressure is effected to a high degree by means of the discharge head 46 by reason of the apertured plates and the apertured bowl, which are a part of the head. It will be observed, also, that the high pressure thus created within the pipe sections 42 to 45 and within the discharge head contributes to the subdividing and dispersing action of the plates, and of the bowl, and also is a factor in the even distribution of the material over the surface 47 in the jets issuing from the orifices 76 of the bowl. In this connection it may be observed that even though the plates 59, 60, and 61 are omitted from the head, a stream of material issuing from the pipe section 45 will impinge upon the solid portion 77 of the bowl and be mushroomed radially outward across the apertures 76 in a manner to cause a certain degree of subdivision and dispersion of the particles of the material.

Within the material reservoir 78 which is mounted on the other end of the plate 22 from the mixing tank 23, are secured division walls 79 and 80 so arranged as to provide a large reservoir compartment 81 in which may be placed oil when the machine is being used for the production of mayonnaise or salad dressing, a smaller reservoir compartment 82 in which may be placed water, and a still smaller reservoir compartment 83 in which may be placed vinegar.

These reservoir compartments 81, 82, and 83 are connected to the short pipe section 40 by means of conduit pipes 84, 85, and 86, respectively, which may be T'd into the pipe section 40 at three separate inlet ports, or may, as shown in the drawings, be united into a common conduit pipe 87 which has a T connection with the pipe section 40 at 88. The pipe conduits 84, 85, and 86 are provided respectively with flow controlling valves 89, 90, and 91. The connection at 88 through which materials from the reservoir 78 may be introduced into the material as it circulates from the tank 23 through the pump and pipe sections 42 to 45 and back to the tank, is designedly placed close to the pump 37 so that any reaction between the materials from the reservoir and the materials in the circulating system may not be initiated until the pump has thoroughly distributed the introduced materials, thereby bringing about a delayed and more even progression of the chemical reaction between the newly introduced materials and the materials of the circulating system.

As has been said above, the machine shown and described herein is but one embodiment of this invention. The features of the invention are adaptable for use in a wide variety of mixing machines or mixing and dispersing machines, or mixing, dispersing, and emulsifying machines, and in machines of this general character used for the production of bakery products, fruit juices, salad dressings, other food products, cosmetics, or other industrial substances.

The machine shown and described herein may be used for the manufacture of a number of different products. In order to explain its operation and set forth some of its advantages, the steps of one particular process for making mayonnaise dressing in accordance with one particular formula will be herein described and set forth.

Into the tank 23 at its upper open end are poured eight pounds of water, five pounds of egg yolk, one and one-half pounds of sugar, salt, and spices in desired proportions. These materials pass through the pipe section 40 to the pump inlet port 41. The pump 37 is then operated for a period of approximately one minute, during which time the sugar and salt go into solution in the water, the spices into suspension and solution, and the egg yolk subdivided into small particles and thoroughly distributed and dispersed throughout the mixture. The subdividing and dispersing action is carried on both in the pump 37 and in the discharge head 46.

Before beginning the manufacture of the batch of dressing, 62 pounds of oil are placed in the reservoir compartment 81, 12 to 16 pounds of water are placed in the reservoir compartment 82, and 5 pounds of vinegar are placed in the reservoir compartment 83. At the termination of the one minute period above mentioned, with the pump still in operation, the valves 89, 90, and 91 are manipulated to gradually and progressively feed the oil, vinegar, and water from the reservoir compartments 81, 82, and 83 respectively into the pipe section 40 where they are incorporated into the material in the circulating system. Although the pipe section 40 is of small diameter, it is apparent that these introduced materials will be incorporated into the materials of the circulating stream in a very uneven manner at this point. However, almost instantaneously after the introduction of the vinegar, oil, and water, the pump 37 will thoroughly mix and render homogeneous all of the component materials of the circulating stream. The vinegar particles enter into a chemical coagulating reaction with the albuminous and other constituents of the egg yolk material. It is to be observed that particles of the albuminous white of the egg are always present with and adhere to egg yolk, and these albinous particles are coagulated by the vinegar. By introducing the vinegar into the circulating stream at a point where this stream flows rapidly through a conduit of minimum cross-sectional area, and by thoroughly mixing the vinegar and egg particles immediately after introduction of the vinegar, the coagulatory action is delayed until the vinegar and egg particles have been evenly distributed relative to each other, thereby promoting a progressive coagulation evenly throughout the mass of material.

The second period of the process during which the oil, vinegar, and water are gradually and progressively introduced into the circulating stream is continued for approximately two minutes. During this period the egg yolk particles are subdivided to the desired size, becoming small flake-like and semi-globular bodies firmed by the coagulating process, pluralities of which enclose globules of oil. The oil particles thus encased in egg material constitute the internal or dispersed phase of the resulting emulsion. They are evenly distributed throughout the external or continuous phase which is made up primarily of the water of the mixture together with the residual vinegar.

After the last of the vinegar, oil, and water have been introduced into the circulating stream at the end of the second stage of the process of making the mayonnaise dressing, which, as has been above said, is of approximately two mintues' duration, the pump is preferably continued in operation for a final period of approximately thirty seconds, during which occur further subdivision of particles of the materials, further coagulation of the egg material, further incorporation of the oil particles of the dispersed phase in the emulgator or emulsifying agent of egg solid and further dispersion of the oil particles thus emulgated throughout the continuous water phase in an even homogeneous emulsifying mixture.

Those familiar with the art will understand the problems of subdividing the various ingredients of the dressing to exactly the right degree. The oil material, for instance, if subdivided too finely, will, unless the emulgator is present in unnecessarily large quantities, cause the emulsion to break. These and other requirements make necessary a finely adjusted balance between fluid pressure generated by the pump, velocity of flow, dimensions of the cross-sectional area of the several parts of the path of the circulating system, rate of cycling, and the subdividing and homogenizing actions of the pump and discharge head both as to time rate and as to efficiency. With a machine constructed in accordance with this invention, all of these factors are either properly provided for in the design of the machine or may be varied at the control of the operator.

Among the many other processes to which the machine shown herein is adapted may be described that of making salad dressing. Water, egg yolk, sugar, salt, and spices are initially placed in the tank as in the process above described, and the pump is operated for a period of approximately one minute. Vinegar and oil, and if desired additional water, are introduced from the reservoir compartments during a subsequent period of operation of the pump for approximately another minute. Then a measured quantity of starch cooked in water to produce a gelatinized substance of the desired consistency is poured into the upper open end of the tank, an operation requiring but a few seconds. The operation of the pump is then continued for another thirty or sixty seconds, during which the subdivision, coagulation, emulgation and dispersion processes are continued, and, in addition, the gelatinized starch is thoroughly and homogeneously incorporated throughout the mixture.

The word "homogenized" has been used in this description and in the appended claims to refer to the action of uniformly dispersing and commingling the particles of the several component materials with respect to each other to produce a homogeneous mass. It does not refer to the degree of subdivision of the particles of a dispersed phase to a point preventing a homogeneous mixture from becoming heterogeneous by gravity or centrifugal action in the same sense that the word "homogenized" is used in connection with the preparation of milk in a form in which the cream will not rise to the top upon standing or may not be separated by centrifugal action.

As a matter of convenience, the word "coagulation" has been used herein to mean broadly the formation of that cellular structure of an emulgator such as egg material which gives it greater solidity and permanence of form.

The word "emulgation" has been used to describe the incorporation of the particles of a dispersed phase within particles of a stabilizing emulgator, such as particles of egg material.

I claim:

1. In a discharge head for a mixing machine, the combination of: a housing; a first multiple apertured, smooth-surfaced, rigid plate mounted in said housing transversely of the flow path of the material to be mixed; and a second apertured, smooth-surfaced, rigid plate mounted in said housing transversely of the flow path of the material downstream from and spaced from said first plate, the total apertured area of the second plate being less than the total apertured area of the first plate, the walls of said apertures in said first plate forming sharp intersecting edges at their downstream ends with the downstream face of said first plate and said apertures being adapted to act as nozzles to produce high pressure jets of liquid when liquid is supplied at high pressure to the upstream surface of said first plate, and the space between said plates being sufficiently great in relation to said jets to allow the formation between said plates of eddy or vortex currents of said liquid which impinge upon the downstream side of said first plate.

2. In a discharge head for a mixing machine, the combination of: a housing; a first multiple apertured, smooth-surfaced, rigid plate mounted in said housing transversely of the flow path of the material to be mixed; and a second apertured, smooth-surfaced, rigid plate mounted in said housing transversely of the flow path of the material downstream from and spaced from said first plate, the total flow resistance of all the apertures in the first plate being less than the total flow resistance of all the apertures in the second plate, the walls of said apertures in said first plate forming sharp intersecting edges at their downstream ends with the downstream face of said first plate and said apertures being adapted to act as nozzles to produce high pressure jets of liquid when liquid is supplied at high pressure to the upstream surface of said first plate, and the space between said plates being sufficiently great in relation to said jets to allow the formation between said plates of eddy or vortex currents of said liquid which impinge upon the downstream side of said first plate.

3. In a discharge head for a mixing machine, the combination of: a housing; a multiple apertured, smooth-surfaced, rigid plate mounted in said housing transversely of the flow of the material to be mixed; and a smooth-surfaced, rigid baffle wall mounted in said housing downstream from and spaced from said plate and adapted to form return eddy currents of the material against the downstream face of said plate, the walls of said apertures in said plate forming sharp intersecting edges at their downstream ends with the downstream face of said plate and said apertures being adapted to act as nozzles to produce high pressure jets of liquid when liquid is supplied at high pressure to the upstream surface of said plate and the space between said plate and baffle wall being sufficiently great in relation to said jets to allow the formation between said plate and baffle wall of eddy or vortex currents of said liquid which impinge upon the downstream side of said plate.

4. In a discharge head for a mixing machine, the combination of: a vertical cylindrical housing having a series of transversely disposed, horizontal, upwardly facing, annular shoulders formed on its inner wall and of progressively smaller diameter in a downstream direction and having a series of vertical cylindrical side walls connecting said shoulders; a corresponding series of apertured, smooth-surfaced, rigid plates slidably fitted within said cylindrical walls and separably resting by gravity upon said shoulders; a cover plate having a central inlet opening of smaller diameter than the topmost of said plates and having a disengageable connection with the upper end of said housing; and an outwardly convex, multiple apertured, spheroidal, rigid bottom wall smooth-surfaced on its upstream side and secured to the lower end of said housing.

5. In an emulsifying machine for producing an emulsion containing an emulgator, the combination of: a vertical cylindrical tank having a conical shaped bottom; a circulating means for withdrawing material from the apex of said conically shaped bottom of said tank and returning it to the upper portion thereof, including a relatively short vertical conduit of relatively smaller diameter connected at its upstream end to the lower end of said tank bottom at said apex, said conduit having a lateral inlet port, a subdividing and mixing means in said circulating means immediately vertically below and downstream from said port; a material reservoir; a second conduit leading from said reservoir to said port; and means for controlling the flow of material in said second conduit.

6. In a circulatory mixing machine, the combination of: a cylindrical tank having a conically shaped bottom and an outlet at the center of said bottom: means for conducting a stream of material from the bottom of said tank and delivering it under pressure to a point in the central upper portion of the tank chamber; means disposed along said conducting means for treating said material; means adjacently upstream from said point for homogeneously mixing the particles of material; and means comprising a plurality of orifices opening into said tank chamber and through which said material is forced under said pressure for depositing said delivered material from said point simultaneously and at the same rate of deposit on all portions of a top surface of the material at a given level in said tank in a plurality of downwardly directed streams.

7. In a particle-subdividing means for use in a dispersing machine having a fluid pressure generator and a duct for conducting material from said generator, the combination of: a housing; means for connecting the outlet end of said duct with said housing; and at least two rigid plates having upstream and downstream faces and being stationarily installed in spaced relation in said housing and across the stream of material issuing from said outlet end, each of said plates having a large number of apertures the walls of said apertures intersecting said faces to form sharp edges therewith, said apertures in any one plate being of substantially uniform cross-sectional area, and the depth of the space between any two proximte plates being at least three times greater than the span of an aperture in the upstream plate of said two proximate plates whereby when material is supplied at high pressure to the upstream face of the upstream plate, high pressure jets of material issuing from the downstream ends of said apertures will have a free travel across said space of sufficient distance to cause the upstream face of the downstream plate to deflect said jets back toward the downstream face of the upstream plate and to set up vortex currents of said material within said space to effect interfacial trituration between particles of said material.

8. In a particle-subdividing means for use in a dispersing machine having a fluid pressure generator and a duct for conducting material from said generator, the combination of: a housing; means for connecting the outlet end of said duct with said housing; and at least two rigid plates having upstream and downstream parallel faces and being stationarily installed in spaced relation in said housing across the stream of material issuing from said outlet end, each of said plates having a large number of substantially parallel walled apertures, the walls of said apertures intersecting said faces to form sharp edges therewith, said apertures in any one plate being of substantially uniform cross-sectional area, the depth of the space between any two proximate plates being at least three times greater than the span of an aperture in the upstream plate of said two proximate plates, and said span being not less than one-half nor greater than the thickness of the upstream plate, whereby said apertures in the upstream plate act as nozzles to produce high pressure jets of material when said material is supplied at high pressure to the upstream face of the upstream plate, and said jets of material upon issuing from the downstream ends of said apertures are characterized by a substantially increasing diameter during their free travel across said space to promote the shearing of particles of the material against said intersecting edges of the downstream face of the upstream plate and the setting up of vortex currents within said space to effect interfacial trituration between the particles of said material.

ERNEST E. LINDSEY.